(12) United States Patent
Ikeda

(10) Patent No.: US 10,824,906 B2
(45) Date of Patent: Nov. 3, 2020

(54) IMAGE PROCESSING DEVICE, NON-TRANSITORY COMPUTER READABLE STORAGE MEDIUM, AND IMAGE PROCESSING SYSTEM

(71) Applicant: OMRON Corporation, Kyoto (JP)

(72) Inventor: Yasuyuki Ikeda, Moriyama (JP)

(73) Assignee: OMRON Corporation, Kyoto (JP)

( * ) Notice: Subject to any disclaimer, the term of this patent is extended or adjusted under 35 U.S.C. 154(b) by 254 days.

(21) Appl. No.: 15/892,381

(22) Filed: Feb. 8, 2018

(65) Prior Publication Data

US 2018/0330193 A1 Nov. 15, 2018

(30) Foreign Application Priority Data

May 11, 2017 (JP) .................................. 2017-094647

(51) Int. Cl.
| | |
|---|---|
| *G06K 9/62* | (2006.01) |
| *G06K 9/46* | (2006.01) |
| *G06T 11/60* | (2006.01) |
| *G06F 3/0484* | (2013.01) |
| *G06T 7/00* | (2017.01) |

(Continued)

(52) U.S. Cl.
CPC ....... *G06K 9/6254* (2013.01); *G06F 3/04847* (2013.01); *G06K 9/00624* (2013.01); *G06K 9/4604* (2013.01); *G06K 9/6271* (2013.01); *G06T 7/0004* (2013.01); *G06T 11/60* (2013.01); *G06K 2009/366* (2013.01); *G06N 3/0454* (2013.01); *G06N 3/08* (2013.01); *G06T 2200/24* (2013.01); *G06T 2207/20084* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 5,546,323 A | * | 8/1996 | Bacus | ................ G06K 9/00147 382/133 |
| 9,495,764 B1 | * | 11/2016 | Boardman | ................ G06T 7/62 |

(Continued)

OTHER PUBLICATIONS

Bolei Zhou et al.,"Learning Deep Features for Discriminative Localization", 2016 IEEE Conference on Computer Vision and Pattern Recognition (CVPR), Jun. 27-30, 2016, pp. 1-10.

*Primary Examiner* — Kevin Ky
(74) *Attorney, Agent, or Firm* — JCIPRNET

(57) ABSTRACT

An image processing device includes: a feature detection image generating unit that generates multiple feature detection images corresponding to multiple classes by applying a convolutional neural network having the classes learned previously to an input image; a post-processing unit that generates a measurement result by performing a post-process on at least some feature detection images of the multiple feature detection images on the basis of a setting parameter; and a user interface unit that receives an input of the setting parameter while presenting a user at least one of at least some of the feature detection images which are generated by the feature detection image generating unit and the measurement result which is generated by causing the post-processing unit to perform the post-process using at least some of the feature detection images which are generated by the feature detection image generating unit.

20 Claims, 13 Drawing Sheets

(51) Int. Cl.
    *G06K 9/00*         (2006.01)
    *G06K 9/36*         (2006.01)
    *G06N 3/04*         (2006.01)
    *G06N 3/08*         (2006.01)

(56) References Cited

U.S. PATENT DOCUMENTS

| | | | |
|---|---|---|---|
| 10,176,198 B1* | 1/2019 | Dhua | G06K 9/627 |
| 10,289,910 B1* | 5/2019 | Chen | G06K 9/00664 |
| 2005/0157941 A1* | 7/2005 | Lim | G06K 15/02 |
| | | | 382/266 |
| 2012/0008838 A1* | 1/2012 | Guyon | G06T 7/66 |
| | | | 382/128 |
| 2016/0098818 A1* | 4/2016 | Reed | G06F 3/0488 |
| | | | 345/173 |
| 2016/0342863 A1* | 11/2016 | Kwon | G06F 16/5854 |
| 2017/0169313 A1* | 6/2017 | Choi | G06K 9/4628 |
| 2017/0243082 A1* | 8/2017 | Song | G06F 16/5838 |
| 2017/0258433 A1* | 9/2017 | Gulsun | G06T 13/20 |
| 2017/0287109 A1* | 10/2017 | Tasfi | G06T 3/4046 |
| 2018/0121768 A1* | 5/2018 | Lin | G06K 9/4628 |
| 2018/0130186 A1* | 5/2018 | Romanenko | G06K 9/4628 |
| 2018/0140282 A1* | 5/2018 | Toyomura | G06T 7/60 |
| 2018/0150727 A1* | 5/2018 | Farooqi | G06K 9/4652 |
| 2019/0023266 A1* | 1/2019 | Kouri | G06K 9/00825 |
| 2019/0065824 A1* | 2/2019 | Gaudet | G06K 9/0063 |
| 2019/0087693 A1* | 3/2019 | Madabhushi | G06K 9/6277 |

* cited by examiner

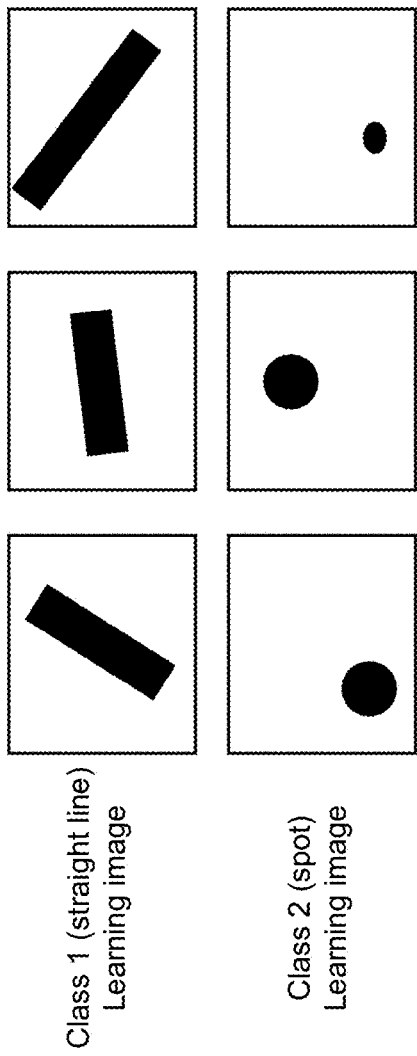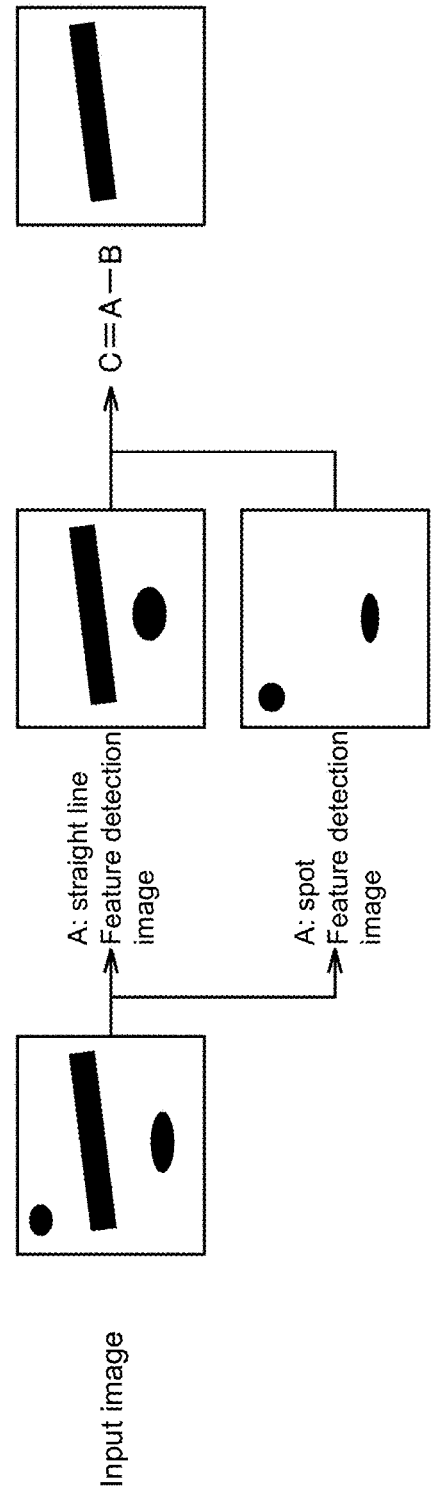

IMAGE PROCESSING DEVICE, NON-TRANSITORY COMPUTER READABLE STORAGE MEDIUM, AND IMAGE PROCESSING SYSTEM

CROSS-REFERENCE TO RELATED APPLICATION

This application claims the priority benefit of Japanese application serial no. 2017-094647, filed on May 11, 2017. The entirety of the above-mentioned patent application is hereby incorporated by reference herein and made a part of this specification.

BACKGROUND

Technical Field

The invention relates to an image processing device, a non-transitory computer readable storage medium, and an image processing system that can perform an image measuring process using a convolutional neural network (CNN).

Description of Related Art

In the field of factory automation (FA), automatic control using an image measuring process has been put to widespread practical use. An inspection process of inspecting the quality of a workpiece is realized, for example, by imaging an inspection object such as a workpiece and calculating a feature such as a defect from the captured image.

A convolutional neural network (hereinafter simply referred to as a "CNN") has attracted attention as an example of such an image measuring process. For example, as described in Non-Patent Document 1, a CNN is a network having a multilayered structure in which a convolutional layer and a pooling layer are alternately arranged.

[Non-Patent Document 1] "Learning Deep Features for Discriminative Localization", Bolei Zhou, Aditya Khosla, Agata Lapedriza, Aude Oliva, Antonio Torralba, The IEEE Conference on Computer Vision and Pattern Recognition (CVPR), 2016, pp. 2921-2929.

As in the technique disclosed in Non-Patent Document 1, when image analysis or the like is performed using a CNN, a CNN is constructed by learning using a plurality of learning images and the constructed CNN is used for the image analysis.

On the other hand, in consideration of the type of usage in the field of FA, the type or the like of a workpiece flowing on a production line is often changed and it is not efficient to construct a CNN every time. Accordingly, there is demand for a configuration suitable for applying an image measuring process using a CNN to the field of FA.

SUMMARY

According to an aspect of the invention, there is provided an image processing device that performs an image measuring process on an input image which is generated by imaging an inspection object. The image processing device includes: a feature detection image generating unit that respectively generates a plurality of feature detection images corresponding to a plurality of classes by applying a convolutional neural network having the plurality of classes learned previously to the input image; a post-processing unit that generates a measurement result by performing a post-process on at least some feature detection images of the plurality of feature detection images on the basis of a setting parameter; and a user interface unit that receives an input of the setting parameter while presenting a user at least one of at least some of the plurality of feature detection images which are generated by the feature detection image generating unit and the measurement result which is generated by causing the post-processing unit to perform the post-process using at least some of the plurality of feature detection images which are generated by the feature detection image generating unit.

According to another aspect of the invention, there is provided a non-transitory computer readable storage medium which stores an image processing program that realizes an image processing device that performs an image measuring process on an input image which is generated by imaging an inspection object. The image processing program causes a computer to perform: a step of respectively generating a plurality of feature detection images corresponding to a plurality of classes by applying a convolutional neural network having the plurality of classes learned previously to the input image; a step of generating a measurement result by performing a post-process on at least some feature detection images of the plurality of feature detection images on the basis of a setting parameter; and a step of receiving an input of the setting parameter while presenting a user at least one of at least some of the plurality of generated feature detection images and the measurement result which is generated by performing the post-process using at least some of the plurality of generated feature detection images.

According to another aspect of the invention, there is provided an image processing system including: an imaging unit that images an inspection object; and an image processing device that performs an image measuring process on an input image which is generated by the imaging unit. The image processing device includes: a feature detection image generating unit that respectively generates a plurality of feature detection images corresponding to a plurality of classes by applying a convolutional neural network having the plurality of classes learned previously to the input image; a post-processing unit that generates a measurement result by performing a post-process on at least some feature detection images of the plurality of feature detection images on the basis of a setting parameter; and a user interface unit that receives an input of the setting parameter while presenting a user at least one of at least some of the plurality of feature detection images which are generated by the feature detection image generating unit and the measurement result which is generated by causing the post-processing unit to perform the post-process using at least some of the plurality of feature detection images which are generated by the feature detection image generating unit.

According to the invention, it is possible to realize a configuration suitable for applying an image measuring process using a CNN to the field of FA.

BRIEF DESCRIPTION OF THE DRAWINGS

FIGS. 7(a) and 7(b) are diagrams illustrating another example of the image calculating process in the image processing device according to the embodiment;

DESCRIPTION OF THE EMBODIMENTS

Figure 1:
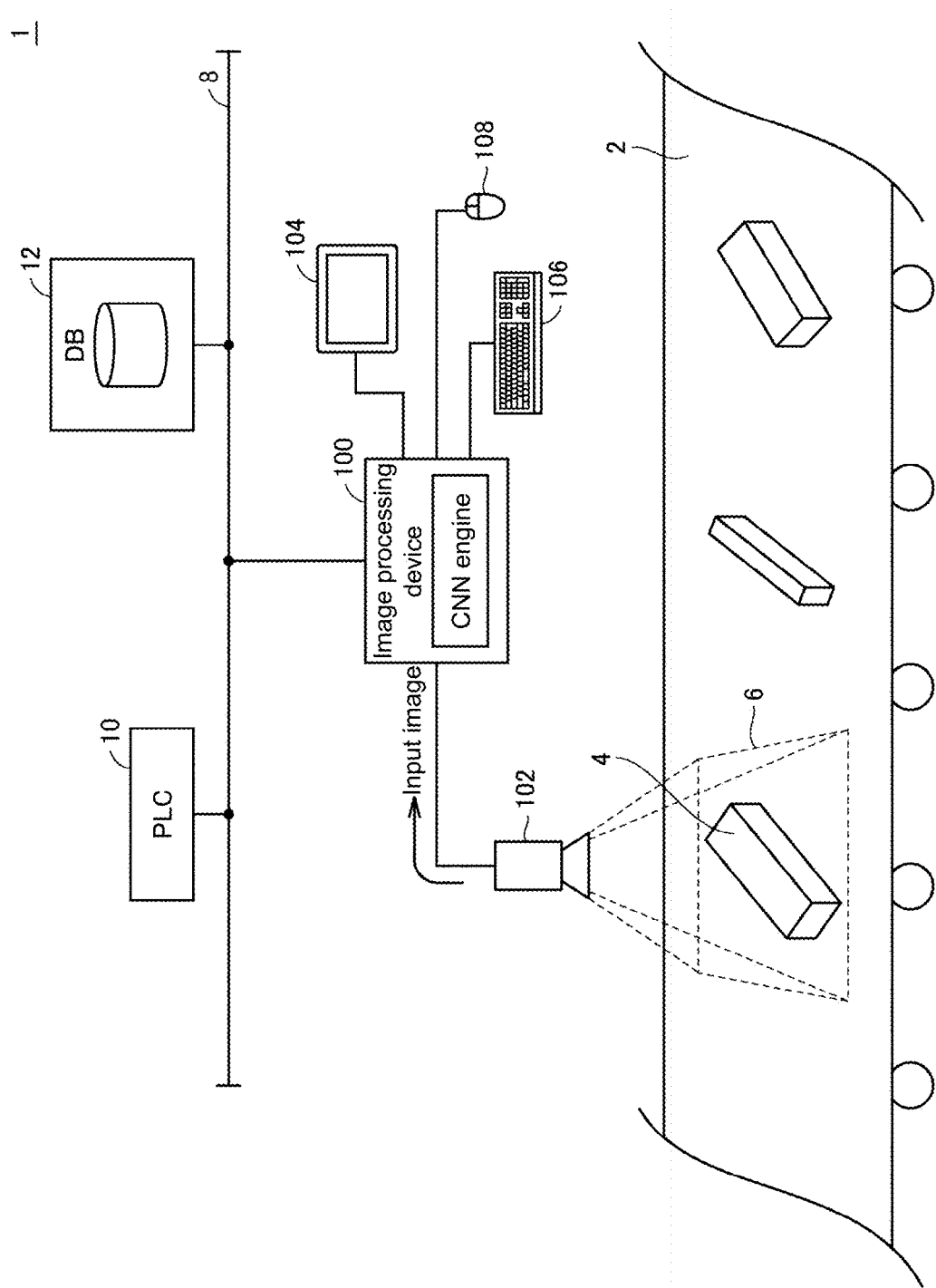
FIG. 1 is a diagram schematically illustrating an example of a system configuration of an image processing system according to an embodiment.

Hereinafter, embodiments of the invention will be described in detail with reference to the accompanying drawings. The same or corresponding elements in the drawings will be referenced by the same reference signs and description thereof will not be repeated.

<A. Example of System Configuration>

First, an example of a system configuration of an image processing system 1 according to an embodiment will be described. The image processing system 1 according to the embodiment performs an image measuring process on an input image which is generated by imaging an inspection object.

FIG. 1 is a diagram schematically illustrating an example of a system configuration of the image processing system 1 according to the embodiment. Referring to FIG. 1, for example, the image processing system 1 implements appearance inspection or appearance measurement of a workpiece 4 by performing an image measuring process on an input image which is acquired by imaging the workpiece 4 as an inspection object transported on a belt conveyer 2. In the following description, an application example such as inspection for defects on the surface of the workpiece 4 will be described in a representative example of the image measuring process, but the invention is not limited thereto and can be applied to identification of a type of defect, measurement of an appearance shape, and the like.

A camera 102 which is an imaging unit is disposed above the belt conveyer 2, and is configured such that an imaging field 6 of the camera 102 includes a predetermined area of the belt conveyer 2. Image data (hereinafter also referred to as an "input image") generated by imaging with the camera 102 is transmitted to an image processing device 100. The imaging with the camera 102 is performed periodically or at the time of occurrence of an event.

The image processing device 100 includes a CNN engine, and a feature detection image for each class is generated from the input image using the CNN engine. It is determined whether there is a defect in a target workpiece, or the like on the basis of the generated one or more feature detection images. Alternatively, a size or a position of a defect or the like may be detected.

The image processing device 100 is connected to a programmable logic controller (PLC) 10 and a database device 12 via an upper network 8. Measurement results in the image processing device 100 may be transmitted to the PLC 10 and/or the database device 12. An arbitrary device in addition to the PLC 10 and the database device 12 may be connected to the upper network 8.

The image processing device 100 may be connected to a display 104 that displays an in-processing state, measurement results, or the like and a keyboard 106 and a mouse 108 serving as an input unit that receives a user's operation.

<B. Hardware Configuration of Image Processing Device 100>

A hardware configuration of the image processing device 100 included in the image processing system 1 according to the embodiment will be described below.

Figure 2:
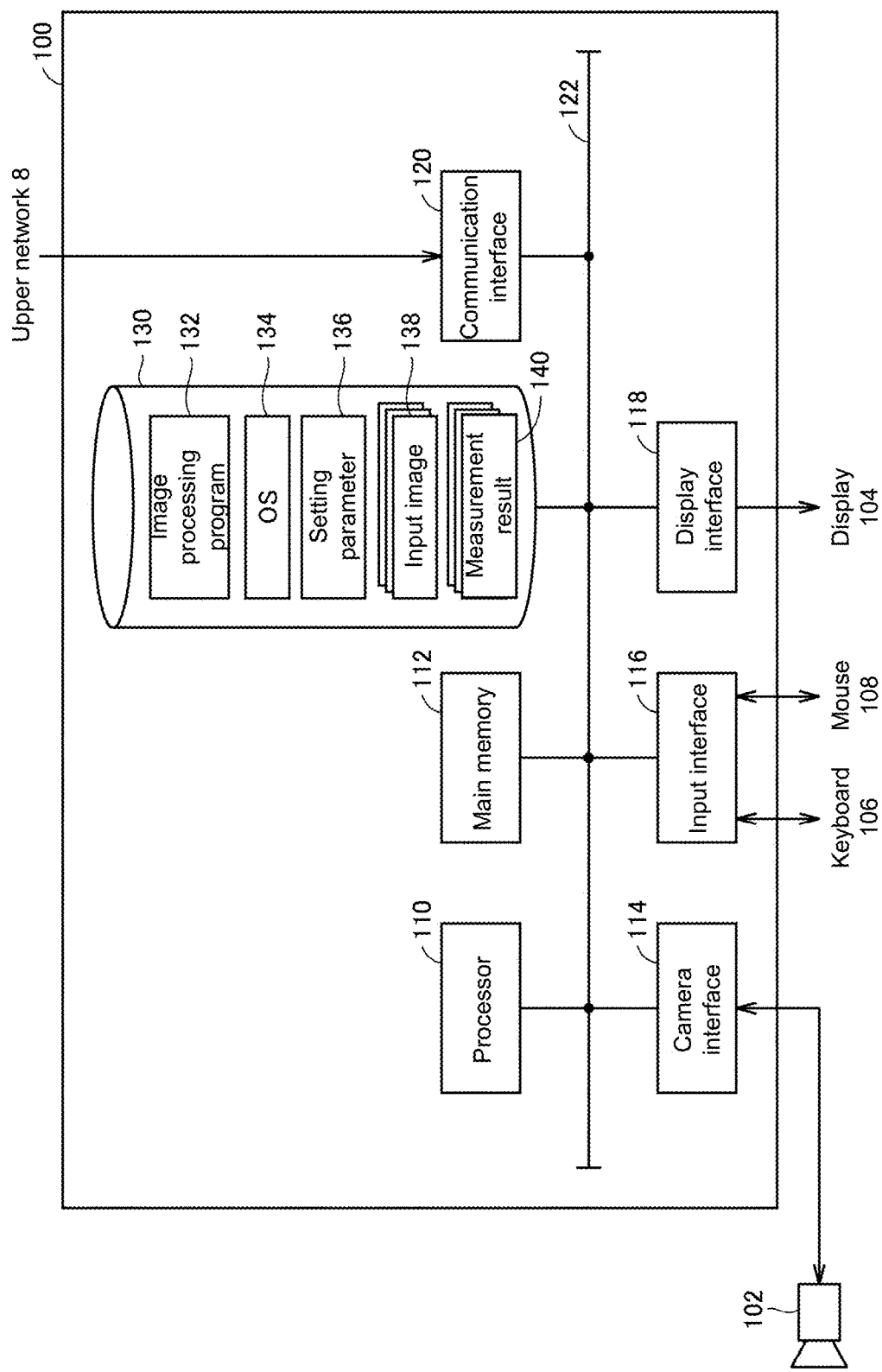
FIG. 2 is a diagram schematically illustrating a hardware configuration of an image processing device according to the embodiment.

FIG. 2 is a diagram schematically illustrating a hardware configuration of the image processing device 100 according to the embodiment. Referring to FIG. 2, the image processing device 100 may be embodied, for example, using a general-purpose computer which is configured with a general computer architecture. The image processing device 100 includes a processor 110, a main memory 112, a camera interface 114, an input interface 116, a display interface 118, a communication interface 120, and a storage 130. These components are connected to each other via an internal bus 122 so as to be able to communicate with each other.

The processor 110 implements functions and processes which will be described later by loading a program stored in the storage 130 into the main memory 112 and executing the program. The main memory 112 is constituted by a volatile memory and serves as a work memory which is required for the processor 110 to execute a program.

The camera interface 114 is connected to the camera 102 and acquires the input image which is taken by the camera 102. The camera interface 114 may instruct an imaging time or the like to the camera 102.

The input interface 116 is connected to the input unit such as the keyboard 106 and the mouse 108 and acquires a command indicating an operation or the like which is performed on the input unit by a user.

The display interface 118 is connected to the display 104 and outputs various processing results which are generated by causing the processor 110 to execute a program to the display 104.

The communication interface 120 takes charge of a process of communicating with the PLC 10, the database device 12, and the like via the upper network 8.

The storage 130 stores programs for causing a computer to serve as the image processing device 100, such as an image processing program 132 and an operating system (OS) 134. The storage 130 may store a setting parameter 136 for realizing an image measuring process which will be described later, an input image 138 acquired from the camera 102, a measurement result 140 acquired through the image measuring process.

The image processing program 132 stored in the storage 130 may be installed in the image processing device 100 via an optical recording medium such as a digital versatile disc (DVD) or a semiconductor recording medium such as a universal serial bus (USB) memory. Alternatively, the image processing program 132 may be downloaded from a server or the like over the network.

When the image processing device is embodied using such a general-purpose computer, some of the functions in the embodiment may be realized by calling and processing necessary software modules among software modules provided by the OS 134 in a predetermined sequence and/or time. That is, the image processing program 132 according to the embodiment may not include all the software modules for realizing the functions in the embodiment, but may provide necessary functions in cooperation with the OS.

The image processing program 132 according to the embodiment may be incorporated as a part of another program and be provided. In this case, the image processing program 132 itself does not include modules included in the other program which can be combined as described above, but processing is performed in cooperation with the other program. In this way, the image processing program 132 according to the embodiment may be incorporated into another program.

FIG. 2 illustrates an example in which the image processing device 100 is embodied using a general-purpose computer, but the invention is not limited to the example. Some or all of the functions may be realized using a dedicated circuit (for example, an application specific integrated circuit (ASIC) or a field-programmable gate array (FPGA)). An external device connected thereto via a network may take charge of some processes.

<C. Image Measuring Process Using CNN>

Problems or the like when image measuring process using a CNN is applied to the field of FA will be described below.

Figure 3:
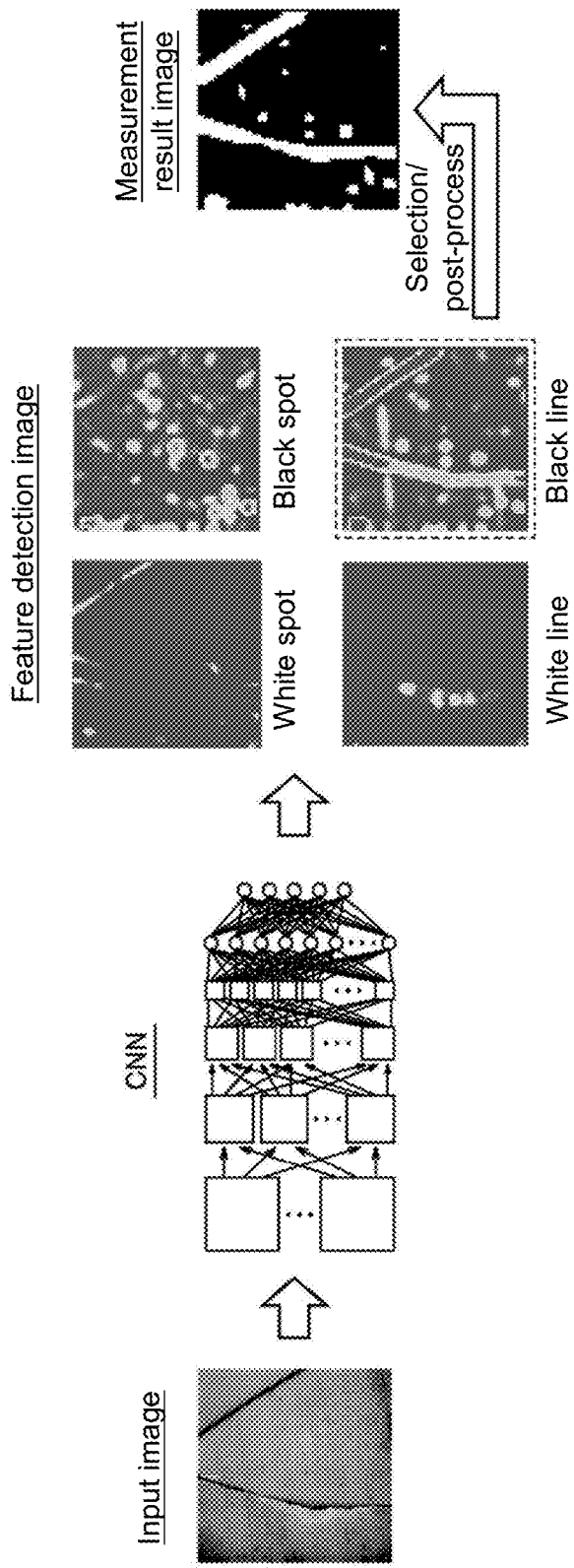
FIG. 3 is a diagram illustrating an example of a process sequence of an image measuring process using a CNN in the image processing system according to the embodiment.

FIG. 3 is a diagram illustrating an example of a process sequence of an image measuring process using a CNN in the image processing system 1 according to the embodiment. In the image processing system 1 according to the embodiment, it is assumed that the CNN having a plurality of classes which are previously learned is used. In FIG. 3, "white spot," "black spot," "white line," and "black line" are illustrated as four types (classes) of defects which are generated in a workpiece. The CNN is constructed by performing prior learning using a plurality of learning images having one feature of the four classes. In the prior learning of the CNN, one of supervised learning and unsupervised learning can be employed.

In the image processing system 1 according to the embodiment, since the CNN having a plurality of types (classes) in advance is used, inputting of a certain input image to the CNN causes generation of a feature detection image for each class.

As illustrated in FIG. 3, by inputting the input image taken with the camera 102 or the like to the CNN, the feature detection images having "white spot," "black spot," "white line," and "black line" as features are generated. In the feature detection images illustrated in FIG. 3, an area indicating each corresponding feature is displayed with gradations to be brighter than the other areas.

On the other hand, since a type of a defect included in the input image is not known, one feature detection image which is considered to extract a defect is selected by comparing the feature detection images, and a measurement result is obtained by applying a post-process such as a binarization process or the like thereto. In the example illustrated in FIG. 3, a result obtained by selecting a feature detection image of "black line" and performing a binarization process on the selected feature detection image of "black line" is illustrated. For example, presence or absence of an extraction target pattern (for example, a defect), a size of the extraction target pattern, a position of the extraction target pattern, and the like in the result of the binarization process may be calculated and may be output as the measurement result.

In this specification, the "measurement result" may include an image (hereinafter also referred to as a "measurement result image") which is used to output a determination result in addition to the determination result (for example, presence or absence of the extraction target pattern (for example, a defect), the size of the feature detection image, and the position of the feature detection image) acquired when the image measuring process is performed on the input image. Depending on process details of a post-process, the measurement result image may be an image which is used to generate a final determination result or may be an image which is generated in the middle of the post-process.

In this way, the image processing system can be embodied by employing a configuration capable of constructing a kind of general-purpose CNN using learning images of a plurality of classes which are representative samples and performing the image measuring process using the CNN.

On the other hand, when the general-purpose CNN is employed, the following problems may be caused.

First, depending on a type or a size of a feature which is present in an input image, the feature may not be completely classified into a specific class but may appear in feature detection images of a plurality of classes. Referring to the example illustrated in FIG. 3, a feature corresponding to "black spot" also appears in the feature detection image of "black line." That is, a feature portion of a spot shape appears commonly in both the feature detection image of "black line" and the feature detection image of "black spot." On the other hand, one feature may be divided and appear in a plurality of feature detection images of a plurality of classes.

Depending on a type or a size of a feature included in the input image, pattern separation of a defect and a non-defect (for example, a background part) is difficult.

Then, it is necessary to set a post-process depending on the type or size of a feature (for example, a defect) to be extracted. In this case, a position of a feature to be extracted in the input image and a position in the measurement result image acquired by the post-process have to be confirmed by comparison, which requires labor and time. When setting is changed again after the post-process has been once set, the same labor is required. That is, measurement results of all the feature detection images generated from an input image have to be confirmed, which requires labor and time.

Therefore, in the image processing system 1 according to the embodiment, an image to be subjected to the post-process is generated depending on a target workpiece commonly using a general-purpose CNN which is previously learned and using some or all of a plurality of feature detection images generated by the CNN. By employing this method, it is possible to realize a more flexible image measuring process.

In the image processing system 1 according to the embodiment, one or more feature detection images which are used to the image measuring process among a plurality of feature detection images generated by the CNN can be flexibly selected. For example, as illustrated in FIG. 3, a measurement result image is output by selecting one feature detection image which is considered to be most appropriate among a plurality of feature detection images and performing the post-process thereon.

In the image processing system 1 image processing system 1 according to the embodiment, an image which is more likely to allow extraction of a feature in a target workpiece may be generated by an image calculating process on a plurality of selected feature detection images.

As illustrated in FIG. 3, a feature corresponding to a "black spot" also appears in the feature detection image of "black line." When the same feature appears in a plurality of feature detection images of a plurality of classes, only a target feature can be extracted by subtracting the feature appearing in one feature detection image from the feature appearing in another feature detection image.

Figure 4:
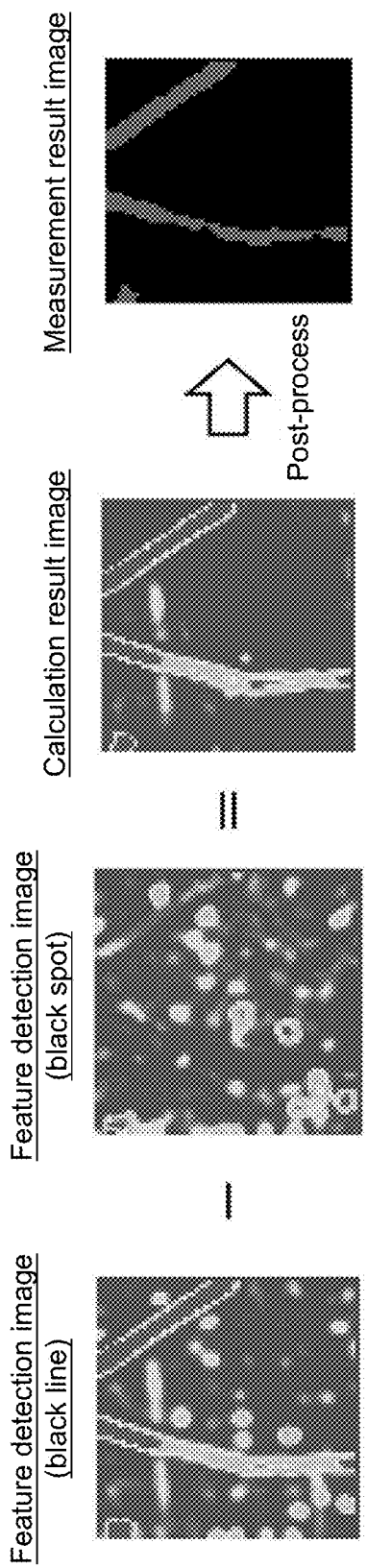
FIG. 4 is a diagram illustrating an example of an image calculating process in the image processing system according to the embodiment.

FIG. 4 is a diagram illustrating an example of an image calculating process in the image processing system 1 according to the embodiment. In FIG. 4, an example of an image calculating process of subtracting a feature detection image of "black spot" from a feature detection image of "black line" is illustrated.

In this embodiment, the "image calculating process" includes performing an arbitrary mathematical process including four fundamental arithmetic operations on corresponding pixels in a plurality of images. In the example illustrated in FIG. 4, a process of calculating a difference between luminance values for each pixel using luminance values of pixels in the feature detection image of "black line" and luminance values of pixels in the feature detection image of "black spot" is performed.

By performing such the image calculating process, a calculation result image illustrated in FIG. 4 is acquired. In the calculation result image, it can be seen that a feature indicating "black spot" which has appeared in the feature detection image of "black line" is deleted or reduced.

The measurement result image is acquired by performing the post-process including a binarization process on the calculation result image. In the measurement result image illustrated in FIG. 4, it can be seen that a feature (a defect) included in the input image is satisfactorily extracted.

<D. Functional Configuration of Image Processing Device 100>

A functional configuration of the image processing device 100 included in the image processing system 1 according to the embodiment will be described below.

Figure 5:
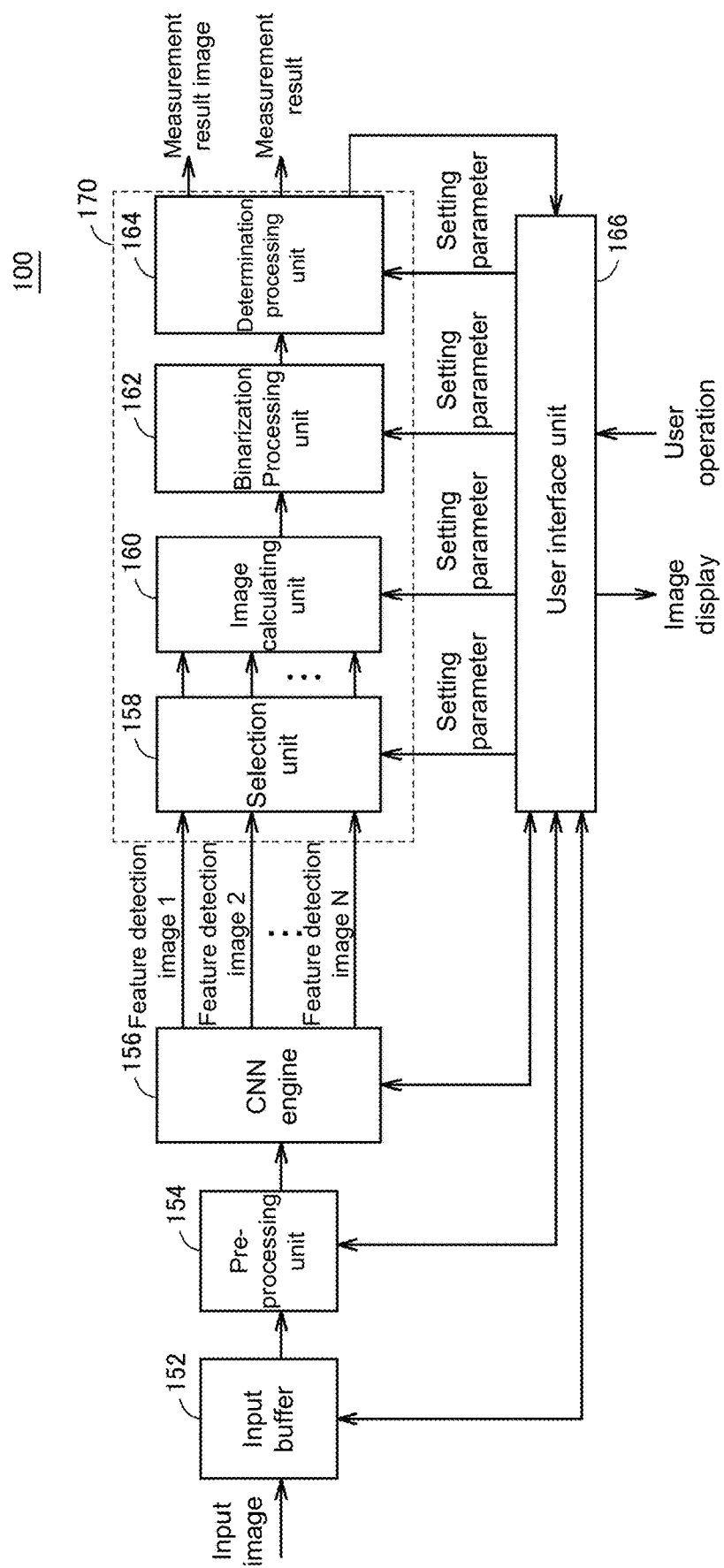
FIG. 5 is a diagram schematically illustrating a functional configuration of the image processing device according to the embodiment.

FIG. 5 is a diagram schematically illustrating a functional configuration of the image processing device 100 according to the embodiment. Functional elements of the image processing device 100 are embodied by causing the processor 110 to execute the image processing program 132.

Referring to FIG. 5, the image processing device 100 includes an input buffer 152, a pre-processing unit 154, a CNN engine 156, a post-processing unit 170, and a user interface unit 166 as the functional elements.

The input buffer 152 temporarily stores an input image which has been taken with the camera 102. The input buffer 152 can be accessed by the pre-processing unit 154 and the user interface unit 166.

The pre-processing unit 154 performs a required pre-process on the input image stored in the input buffer 152. This pre-process is performed for the purpose of processing the input image to facilitate extraction of a feature by the CNN engine 156 located in the subsequent stage. Specific examples of the pre-process include brightness correction and color/gray conversion. Details of the pre-process may be designated by a user via the user interface unit 166. The pre-processed input image is output to the CNN engine 156.

The CNN engine 156 provides a feature detection image generating function of generating a plurality of feature detection images corresponding to a plurality of classes by applying the CNN having the plurality of classes which are previously learned to the input image. More specifically, the CNN engine 156 includes a network which is previously learned to have classification ability into a predetermined number of classes and outputs the feature detection image (feature detection image 1, feature detection image, 2, . . . , feature detection image N) corresponding to each of the classes. The plurality of feature detection images generated by the CNN engine 156 are output to the post-processing unit 170 and can be accessed by the user interface unit 166.

The post-processing unit 170 generates a measurement result by performing the post-process on at least some feature detection images of the plurality of feature detection images output from the CNN engine 156 based on the setting parameter. The post-processing unit 170 includes a selection unit 158, an image calculating unit 160, a binarization processing unit 162, and a determination processing unit 164.

The selection unit 158 outputs one or more feature detection images, which are designated from the plurality of feature detection images output from the CNN engine 156, to the image calculating unit 160 based on the setting parameter from the user interface unit 166. The setting parameter includes information indicating which feature detection image to select of the plurality of feature detection images.

The image calculating unit 160 performs an image calculating process on the plurality of feature detection images from the selection unit 158 based on the setting parameter from the user interface unit 166 if necessary, and outputs the result to the binarization processing unit 162. That is, the image calculating unit 160 provides an image calculating function of generating a calculation result image by performing the image calculating process using two or more feature detection images of the plurality of feature detection images. When only one feature detection image is output from the selection unit 158, or the like, the image calculating unit 160 may output the feature detection image to the binarization processing unit 162 without performing any image calculating process. The setting parameter includes information indicating what image calculating process to perform.

Examples of the image calculating process include an addition operation, a subtraction operation, and weighted operations thereof. That is, the image calculating process typically includes at least one of addition of the feature detection images, subtraction of the feature detection image, weighted addition of the feature detection images, and weighted subtraction of the feature detection images.

The binarization processing unit 162 generates a binarized image by performing a binarization process on an image (an arbitrary feature detection image or calculation result image) from the image calculating unit 160 on the basis of the setting parameter from the user interface unit 166. That is, the binarization processing unit 162 provides a function of performing the binarization process on the feature detection image or the calculation result image. The setting parameter includes a threshold value (also referred to as a "binarization level") which is used for the binarization process.

The determination processing unit 164 performs a determination process on the binarized image from the binarization processing unit 162 based on the setting parameter from the user interface unit 166. More specifically, the determination processing unit 164 performs more accurate determination by labeling the binarized image generated by the binarization processing unit 162, calculating a labeled area, a labeled shape, and the like, and comparing the calculation result with a predetermined threshold value.

Such the determination process includes, for example, a process of determining whether a target feature is included in the input image on the basis of whether the area (as a feature area) of an extracted part is equal to or greater than a predetermined threshold value. The setting parameter includes information for designating a threshold value or determination logic used for the determination process.

The selection unit 158, the image calculating unit 160, the binarization processing unit 162, and the determination processing unit 164 are parts taking charge of performing of the post-process on the feature detection images output from the CNN engine 156.

The user interface unit 166 receives an input of the setting parameter while presenting a user at least one of at least some of a plurality of feature detection images generated by the CNN engine 156 and the measurement result generated by the post-processing unit 170 by performing the post-process using at least some of the plurality of feature detection images generated by the CNN engine 156. More specifically, the user interface unit 166 presents (displays) a user a measurement result image generated through the image measuring process and images generated in the course of performing the image measuring process via the display 104, and receives an instruction (a user operation) input from the user via the keyboard 106, the mouse 108, and the like. The user interface unit 166 generates the setting parameter corresponding to the user operation and outputs the generated setting parameter to the selection unit 158, the image calculating unit 160, the binarization processing unit 162, and the determination processing unit 164 which take charge of the post-process. The setting parameter generated by the user interface unit 166 is stored in the storage 130 or the like (the setting parameter 136 in the storage 130 illustrated in FIG. 2).

An example of a user interface screen which is provided by the user interface unit 166 will be described later.

<E. Example of Image Calculating Process>

Some examples in which a feature can be more appropriately extracted by performing the image calculating process on the plurality of feature detection image feature detection images will be described below.

(e1: Case in which an Extraction Target Pattern Locally Includes Features of a Plurality of Classes)

Figure 6A:
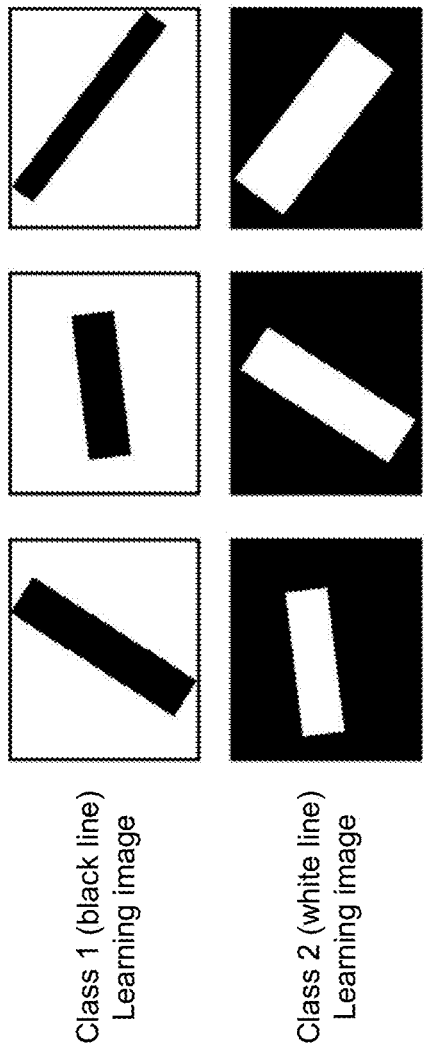
FIGS. 6(a) and 6(b) are diagrams illustrating an example of an image calculating process in the image processing device according to the embodiment.
Figure 6B:
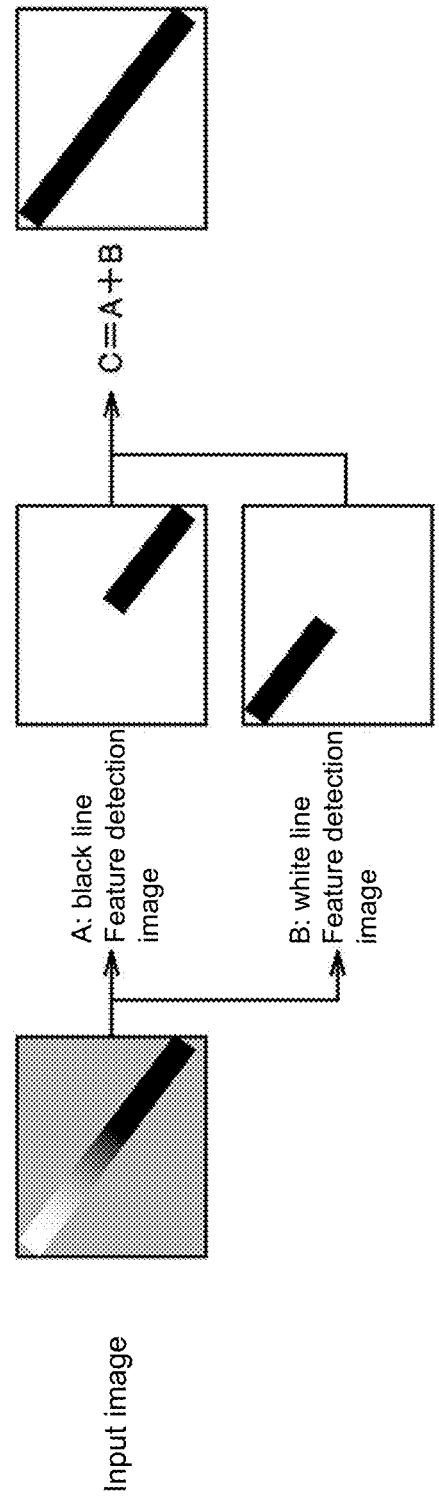

FIGS. 6(*a*) and 6(*b*) are diagrams illustrating an example of an image calculating process in the image processing device 100 according to the embodiment. FIG. 6(*a*) illustrates an example of learning images which are used to construct the CNN, and FIG. 6(*b*) illustrates an example of an image calculating process which is performed on the feature detection images generated from the CNN constructed using the learning images illustrated in FIG. 6(*a*).

For example, as illustrated in FIG. 6(*a*), it is assumed that the CNN has been constructed using the plurality of learning images including a feature of a black line as class 1 and the plurality of learning images including a feature of a white line as class 2. When the input image illustrated in FIG. 6(*b*) is applied to the CNN, a single extraction target pattern is divided and appears in the feature detection images of a plurality of classes. That is, the input image illustrated in FIG. 6(*b*) includes the feature of the black line and the feature of the white line and the feature detection images of classes with different features are separately extracted therefrom.

In this case, it is possible to generate an image including both features by employing the image calculating process of adding the feature detection images.

(e2: Case in which a Feature of an Extraction Target Pattern is Included in a Plurality of Classes)

FIGS. 7(*a*) and 7(*b*) are diagrams illustrating another example of the image calculating process in the image processing device 100 according to the embodiment. FIG. 7(*a*) illustrates an example of learning images which are used to construct the CNN, and FIG. 7(*b*) illustrates an example of the image calculating process which is performed on the feature detection images generated from the CNN which has been constructed using the learning images illustrated in FIG. 7(*a*).

For example, as illustrated in FIG. 7(*a*), it is assumed that a CNN has been constructed using the plurality of learning images including a feature of a straight line as class 1 and the plurality of learning images including a feature of a spot as class 2. When the input image illustrated in FIG. 7(*b*) is applied to the CNN, the feature appears in the feature detection images of all possible classes. That is, an elliptical spot pattern which is present on the lower side of the input image illustrated in FIG. 7(*b*) appears as features in both the class of spot and the class of straight line. The elliptical spot pattern is a spot and thus is the feature which should not be extracted as the straight line.

In this state, when it is intended to extract only a straight line included in the input image, a calculation result image (image C) not including the elliptical spot pattern can be generated by subtracting the feature detection image (image B) of the spot from the feature detection image (image A) of the straight line.

(e3: Case in which a Feature of an Extraction Target Pattern Appears with Different Intensities Depending on Classes)

Figure 8:
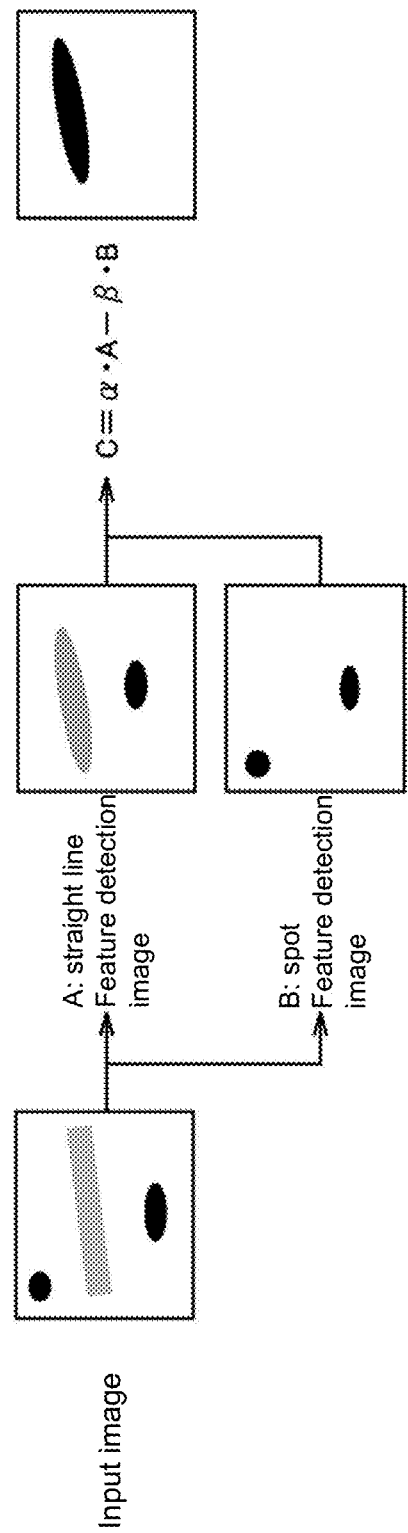
FIG. 8 is a diagram illustrating another example of the image calculating process in the image processing device according to the embodiment.

FIG. 8 is a diagram illustrating another example of the image calculating process in the image processing device 100 according to the embodiment. As illustrated in FIG. 7(*a*), it is assumed that the CNN has been constructed using the plurality of learning images including the feature of the straight line as class 1 and the plurality of learning images including the feature of the spot as class 2.

When the input image illustrated in FIG. 8 is applied to the CNN, the feature appears in the feature detection images of all possible classes. Here, the elliptical spot pattern which is not the extraction target appears more intensive in the feature detection image of the straight line than in the feature detection image of the spot. A line pattern which is the extraction target has low contrast and exhibits small reaction in the feature detection image of the straight line (has a low density in this example).

When there are differences in intensity between the feature detection images, a feature of the elliptical spot pattern which is not the extraction target may remain even by subtracting the feature detection image of the spot (image B) from the feature detection image of the straight line (image A). That is, in the image calculating process on the feature detection images, at least one feature detection image may be multiplied by an appropriate coefficient.

In the example illustrated in FIG. 8, the image calculating process of "$C = \alpha \times A - \beta \times B$" can be performed by multiplying the feature detection image of the straight line (image A) and the feature detection image of the spot (image B) by a coefficient α and a coefficient β (in the example illustrated in FIG. 8, β>α), and thus it is possible to a calculation result image (image C) not including the elliptical spot pattern.

The coefficient α and the coefficient β may be adjusted by the user while watching the calculation result image or the coefficients may be optimized by causing the user to designate an area which should not be extracted.

(e4: Summary)

The image calculating process according to the embodiment is not limited the above-mentioned examples of the image calculating process and can employ arbitrary calculation depending on usage. For the purpose of convenience of explanation, the image calculating process using two feature detection images has been exemplified, but the invention is not limited thereto and an image calculating process using three or more feature detection images may be performed.

That is, the image calculating process according to the embodiment can include performing linear calculation or nonlinear calculation on a plurality of feature detection images such that an extraction target pattern appears strongly.

By performing such the image calculating process, typically by performing subtraction operation on the feature detection images, a pattern which is not an extraction target and appears in the feature detection images of a plurality of classes can be cancelled. Alternatively, when the same extraction target pattern appears in the feature detection images of a plurality of classes, an image including an entire extraction target pattern can be generated by performing an addition operation on the feature detection images.

<F. Example of User Interface Screen>

Some examples of a user interface screen which is provided by the image processing device 100 according to the embodiment will be described below.

(f1: Selection of Feature Detection Image)

Figure 9:
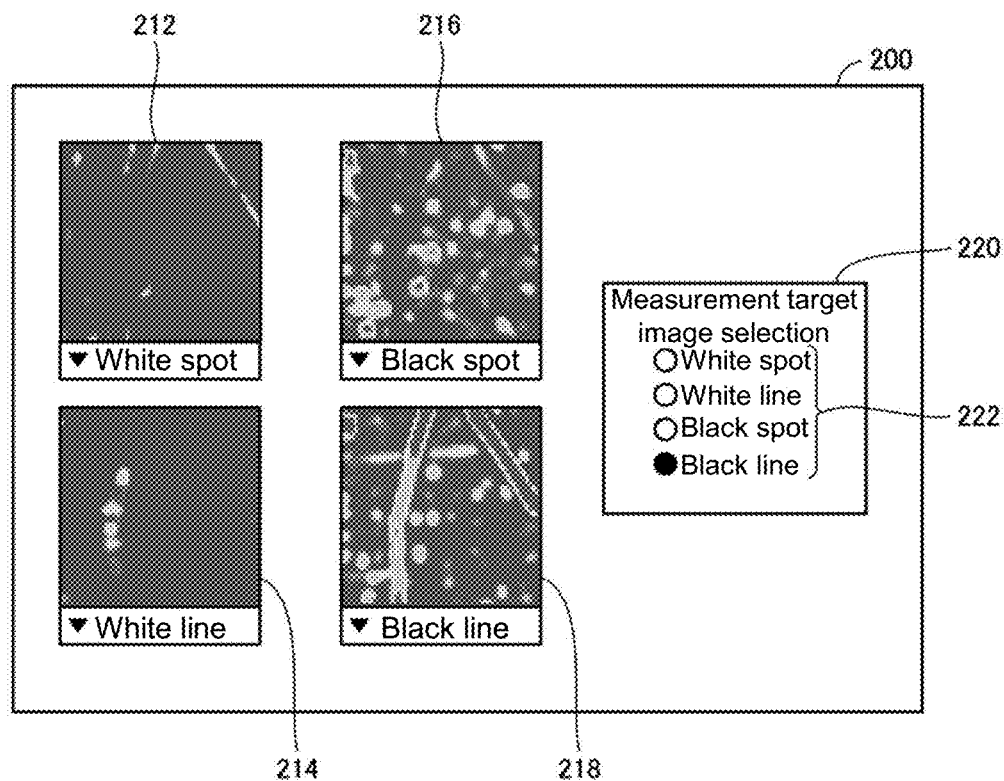
FIG. 9 is a diagram schematically illustrating an example of a user interface screen 200 which is provided by the image processing device according to the embodiment.

FIG. 9 is a diagram schematically illustrating an example of a user interface screen 200 which is provided by the image processing device 100 according to the embodiment. Referring to FIG. 9, four feature detection images 212, 214, 216, and 218 which are generated by applying the CNN to an arbitrary input image are listed in the user interface screen 200.

The user interface screen 200 includes a selection receiving area 220 that receives selection of which feature detection image of the four feature detection images 212, 214, 216, and 218 to use for the image measuring process. The selection receiving area 220 includes, for example, radio button group 222 for receiving selection of the feature detection image.

The user selects a feature detection image suitable for the image measuring process by performing a selection operation on the radio button group 222 while watching the plurality of feature detection images 212, 214, 216, and 218 listed on the user interface screen 200. The feature detection image selected by such an operation is used for the image measuring process. The selection operation with respect to the radio button group 222 may be included in the setting parameter which is transmitted from the user interface unit 166 illustrated in FIG. 5 to the selection unit 158.

(f2: Selection of Measurement Result Image)

Figure 10:
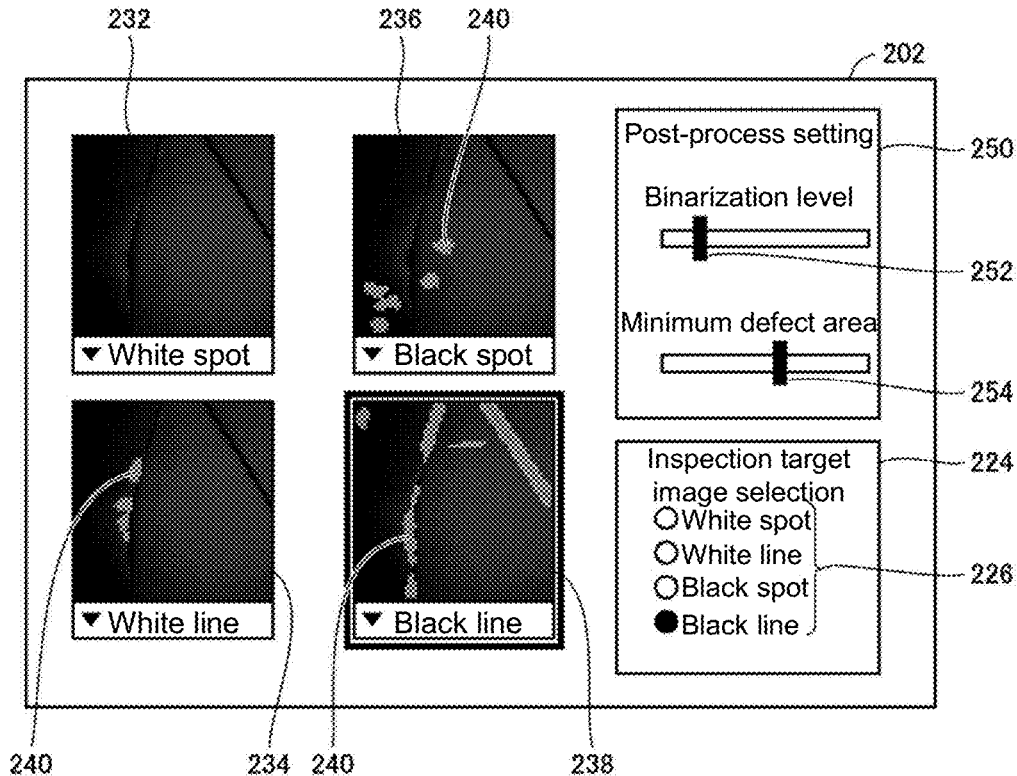
FIG. 10 is a diagram schematically illustrating an example of a user interface screen 202 which is provided by the image processing device according to the embodiment.

FIG. 10 is a diagram schematically illustrating an example of a user interface screen 202 which is provided by the image processing device 100 according to the embodiment. Referring to FIG. 10, measurement result images 232, 234, 236, and 238 which are generated by performing the post-process on the feature detection images generated by applying the CNN to an arbitrary input image are listed in the user interface screen 202.

The user interface screen 202 includes a selection receiving area 224 that receives selection of which measurement result image of the four measurement result images 232, 234, 236, and 238 to use for the image measuring process. The selection receiving area 224 includes, for example, radio button group 226 for receiving selection of a measurement result image.

The user selects a measurement result image suitable for the image measuring process by performing a selection operation on the radio button group 226 while watching the plurality of measurement result images 232, 234, 236, and 238 listed on the user interface screen 202. The measurement result is output on the basis of the measurement result image selected by such the operation.

A plurality of selections may be received by the radio button group 226. In this case, an image which is acquired by adding the two or more selected measurement result images may be output as the measurement result image.

The operation of selecting the radio button group 226 may be included in the setting parameter which is transmitted from the user interface unit 166 illustrated in FIG. 5 to the selection unit 158.

In the measurement result images 232, 234, 236, and 238 which are listed in the user interface screen 202, an area (a detection area 240) extracted as a corresponding feature (a defect in this example) is displayed in a display mode which is different from another area. A user can determine which measurement result image can be appropriately used as the measurement result by confirming a size, a position, or the like of the detection area 240 displayed in each of the measurement result images 232, 234, 236, and 238.

The user interface screen 202 includes a post-process setting receiving area 250 for receiving a setting parameter associated with the post-process. The post-process setting receiving area 250 includes, for example, a slider 252 for receiving a set value of a threshold value (a binarization level) which is used for the binarization process and a slider 254 for receiving a set value of a minimum area of an area which is considered as a defect in the area reacting with the corresponding feature (hereinafter referred to as a "minimum defect area").

When the user operates the slider 252, the threshold value which is used for the binarization process changes and image details of the plurality of measurement result images 232, 234, 236, and 238 which are listed in the user interface screen 202 changes accordingly. More specifically, the size or the like of the detection area 240 in each measurement result image changes by interlocking with the user's operation of the slider 252.

The user's operation of the slider 252 may be included in the setting parameter which is transmitted from the user interface unit 166 illustrated in FIG. 5 to the binarization processing unit 162. That is, the user interface unit 166 (FIG. 5) of the image processing device 100 receives setting of the threshold value which is used for the binarization process in the binarization processing unit 162 as the setting parameter.

When the user operates the slider 254, the minimum defect area changes and image details of the plurality of measurement result images 232, 234, 236, and 238 which are listed in the user interface screen 202 changes accordingly. More specifically, the size or the like of the detection area 240 in each measurement result image changes by interlocking with the user's operation of the slider 254.

The user's operation of the slider 254 may be included in the setting parameter which is transmitted from the user interface unit 166 illustrated in FIG. 5 to the determination processing unit 164.

Figure 11:
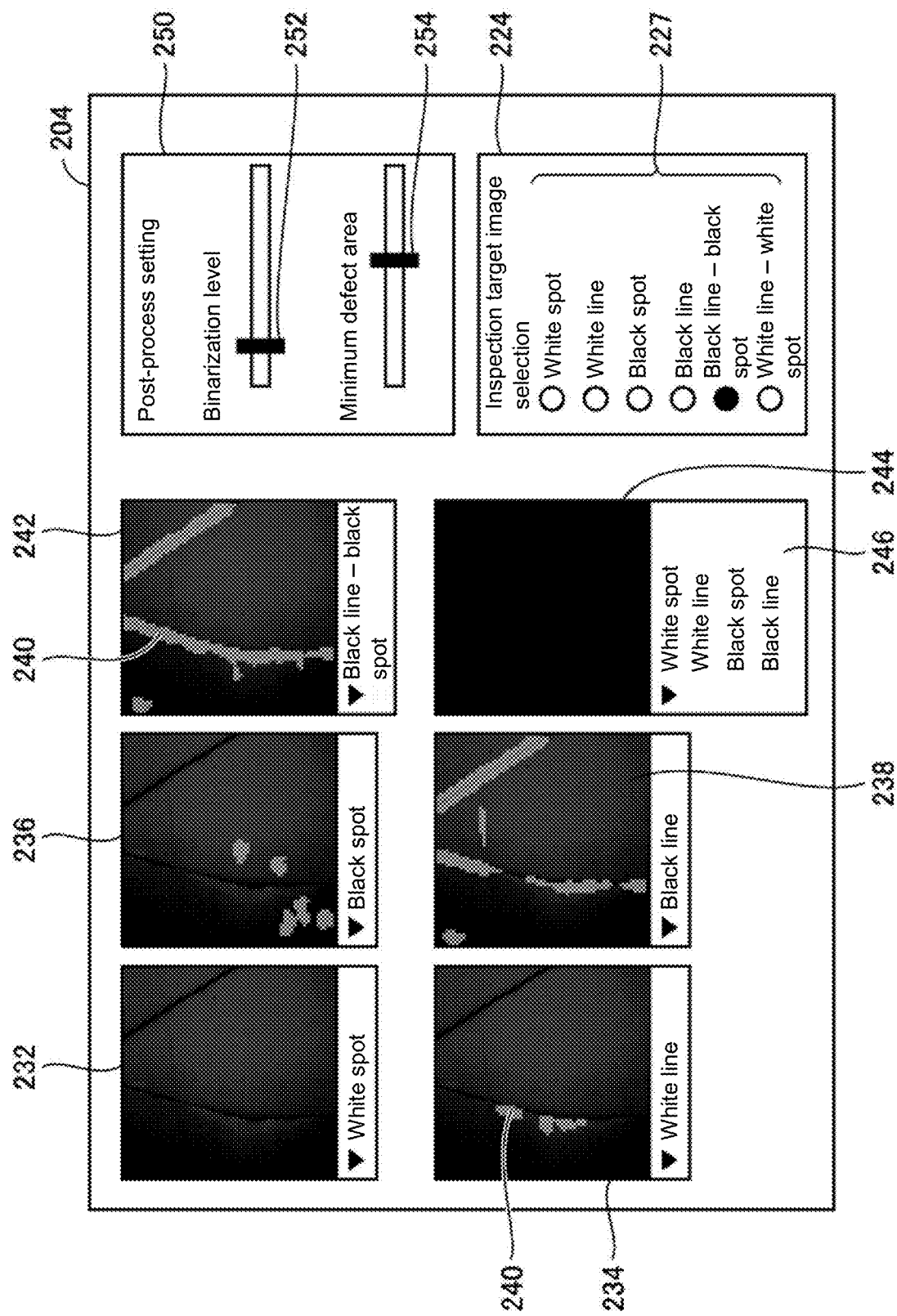
FIG. 11 is a diagram schematically illustrating an example of a user interface screen 204 which is provided by the image processing device according to the embodiment.

FIG. 11 is a diagram schematically illustrating an example of a user interface screen 204 which is provided by the image processing device 100 according to the embodiment. Referring to FIG. 11, the user interface screen 204 is an extension of the user interface screen 202 illustrated in FIG. 10.

Referring to FIG. 11, the measurement result images 232, 234, 236, and 238, which are generated by performing the post-process on the feature detection images generated by applying the CNN to an arbitrary input image, are listed in the user interface screen 204.

In the user interface screen 204, a measurement result image 242 which is generated by performing the post-process on the calculation result image arbitrarily selected by the user is additionally displayed. The measurement result image 242 illustrated in FIG. 11 is obtained by applying the same post-process as the post-process applied to other feature detection images to the calculation result image which is acquired by subtracting the feature detection image of a black spot from a feature detection image of a black line.

In this way, the user interface screen 204 can present the user the measurement result which is generated from the calculation result image in addition to the measurement result generated from the feature detection images alone.

In the user interface screen 204, an image which is displayed in a display area 244 may be freely selected by operating a pull-down list 246. The user selects a measurement result image to be output as the measurement result by selecting one of the radio button group 227 included in the selection receiving area 224. In this way, the user can arbitrarily select which of the feature detection images in the image processing device 100 to display. That is, the user interface unit 166 (FIG. 5) of the image processing device 100 can determine a type of an image to be presented to the user by the user's selection.

The other areas of the user interface screen 204 illustrated in FIG. 11 are the same as the corresponding areas of the user interface screen 202 illustrated in FIG. 10 and thus detailed description thereof will not be repeated.

The user interface screens illustrated in FIGS. 10 and 11, when the setting parameter is changed by the user's operation, displayed images (the input image is excluded) are regenerated on the basis of the changed setting parameter and the display is updated on the basis of the regenerated images. That is, when the user interface unit 166 (FIG. 5) of the image processing device 100 receives change of the setting parameter from the user, the post-processing unit 170 (FIG. 5) generates a new measurement result by performing the post-process on the changed setting parameter and the user interface unit 166 presents the user the newly generated measurement result. In this way, since display details are updated by interlocking with the user's setting operation, the user can easily optimize the setting parameter.

(f3: Superimposed Display of Measurement Result Image and Input Image)

In the user interface screens illustrated in FIGS. 10 and 11, the measurement result image may be superimposed and displayed on the input image. By performing such superimposed display, the user can evaluate whether a feature in the measurement result image has been correctly extracted as the detection area 240 while watching a feature (for example, a defect) to be extracted which is present in an actually taken input image. The user can determine an appropriate setting parameter by adjusting the slider 252 and/or the slider 254 included in the post-process setting receiving area 250 while sequentially performing comparison in the screen.

Figure 12:
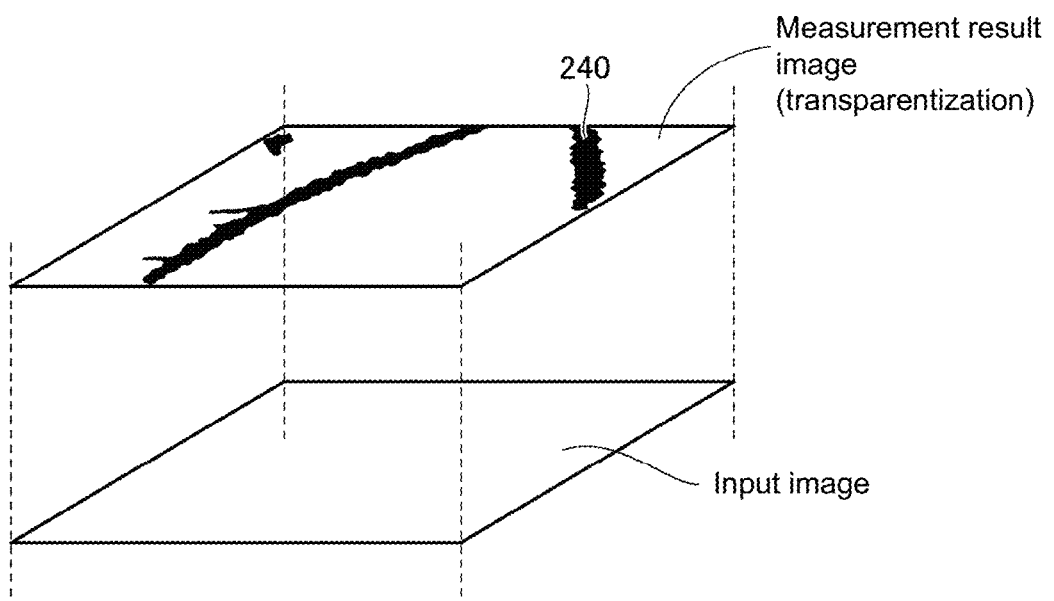
FIG. 12 is a diagram illustrating superimposed display of measurement result images in the user interface screens illustrated in FIGS. 10 and 11.

FIG. 12 is a diagram illustrating superimposed display of measurement result images in the user interface screens illustrated in FIGS. 10 and 11. Referring to FIG. 12, area other than the detection area 240 in the measurement result image is transparentized and the input image is arranged as a background. By performing image display by layers, a state in which the detection area 240 is superimposed and displayed on the input image can be expressed. In this way, in the image processing device 100 according to the embodiment, the detection area 240 may be superimposed and displayed on the input image.

The feature detection image instead of the measurement result image may be superimposed and displayed on the input image. An image which is superimposed and displayed on the input image may be arbitrarily selected by the user.

The measurement result may be superimposed and displayed on the input image.

Figure 13:
FIG. 13 is a diagram illustrating an example in which a measurement result is superimposed and displayed on an input image which is provided by the image processing device according to the embodiment.

FIG. 13 is a diagram illustrating an example in which a measurement result is superimposed and displayed on an input image which is provided by the image processing device 100 according to the embodiment. Referring to FIG. 13, the measurement result acquired by performing the image measuring process on a certain input image may be superimposed and displayed on the input image.

In this case, a defect position or the like indicated by an extracted detection area may be superimposed and displayed on the input image. A cross-shaped cursor may be displayed at the center-of-gravity position of the extracted detection area or a rectangle surrounding the extracted detection area may be displayed.

As described above, the user interface unit 166 (FIG. 5) of the image processing device 100 presents the user an image in which the measurement result is superimposed and displayed on the input image. In this way, by superimposing and displaying an object for evaluating the measurement result, the user can more easily adjust the setting parameter which is used for the image measuring process.

(f4: Display Mode of Detection Area)

FIGS. 10 to 13 illustrate an example in which the detection area 240 extracted to correspond to an extraction target pattern is displayed in a binarized state. The extracted detection area 240 may be displayed using a color such as red or yellow which can be clearly distinguished from the other areas.

A display density, luminance, or the like of the detection area 240 may be changed depending on the magnitude of an intensity expressed in the feature detection image instead of the binarized state. For example, as a larger intensity is expressed in the feature detection image, the display density may be increased. That is, the display density or the display color may be continuously changed depending on the magnitude of the intensity expressed in the feature detection image.

The display density may be stepwise changed depending on the magnitude of the intensity expressed in the feature detection image. Alternatively, the display color may be stepwise changed depending on the magnitude of the intensity expressed in the feature detection image.

When the display mode is changed continuously or stepwise, a mode of change, a degree of change, or the like may be set by the user or externally. For example, a color range of the display color which is changed may be arbitrarily set by the user.

(f5: Display of a Plurality of Images)

In FIG. 9 illustrates an example in which feature detection images of different classes are displayed in a list, and FIGS. 10 and 11 illustrate an example in which measurement result images generated from feature detection images of different classes are displayed in a list.

In addition to a plurality of images of the same type, images which are arbitrarily selected from images which are sequentially generated in the course of performing the image measuring process, for example, the input image, pre-process result images acquired by pre-processing the input image, feature detection images, calculation result images, and binarized images, may be displayed in a list. The images which are displayed in a list may be arbitrarily selected by the user.

<G. Process Sequence>

A process sequence in the image processing system 1 according to the embodiment will be described below. In the image processing system 1 according to the embodiment, there are a preparation process of setting a setting parameter associated with the image measuring process and an operating process of actually imaging a target workpiece and performing the image measuring process.

Figure 14:
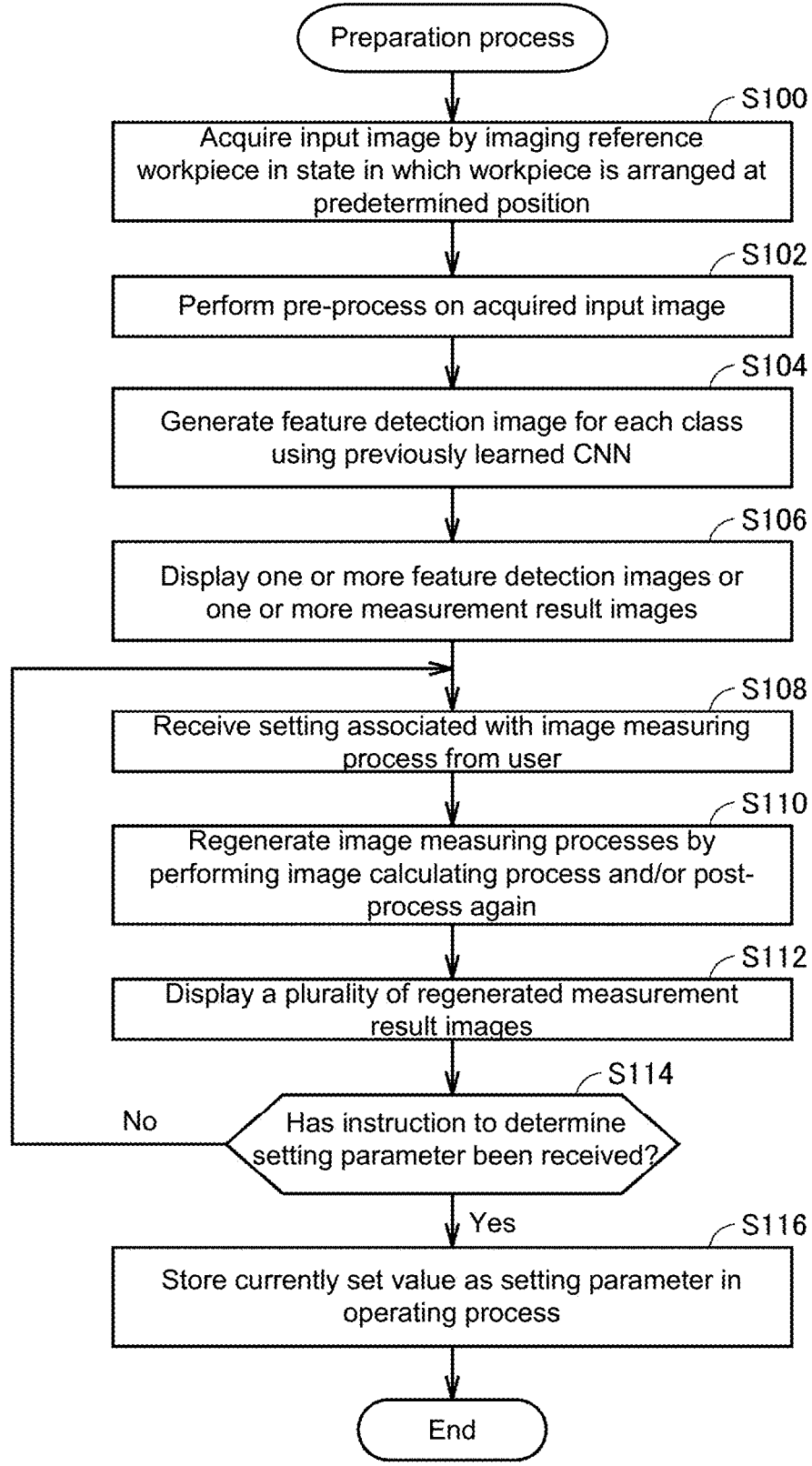
FIG. 14 is a flowchart illustrating a process sequence of a preparation process in the image processing system according to the embodiment.
Figure 15:
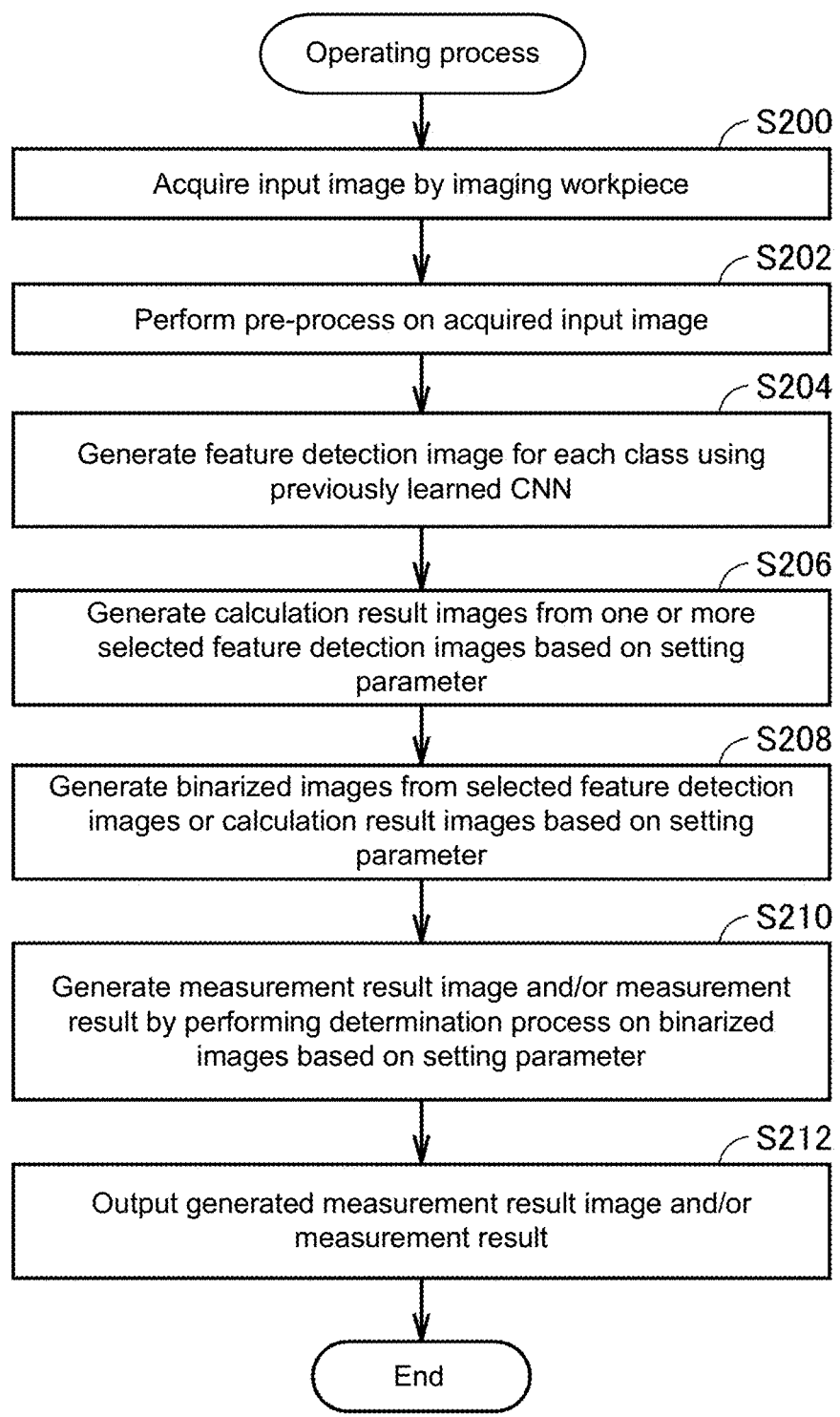
FIG. 15 is a flowchart illustrating a process sequence of an operating process in the image processing system according to the embodiment.

FIG. 14 is a flowchart illustrating a process sequence of a preparation process in the image processing system 1 according to the embodiment. FIG. 15 is a flowchart illustrating a process sequence of an operating process in the image processing system 1 according to the embodiment. The steps of the process sequences illustrated in FIGS. 14 and 15 are typically implemented by causing the processor 110 of the image processing device 100 to execute the image processing program 132 or the like.

Referring to FIG. 14, the image processing device 100 acquires an input image which is obtained by imaging a workpiece serving as a reference of an image measuring process using the camera 102 in a state in which the workpiece is located at a predetermined position (Step S100). At this time, the input image (image data) which is generated by imaging the workpiece with the camera 102 is transmitted to the image processing device 100 and is loaded to the main memory 112 of the image processing device 100. Subsequently, the image processing device 100 performs a pre-process on the acquired input image (Step S102).

The image processing device 100 performs a process of extracting a feature for each of one or more types (classes) of features from the pre-processed input image using a previously learned CNN. The image processing device 100 generates a feature detection image for each of one or more classes by the process of extracting the feature (Step S104). Finally, the image processing device 100 displays one or more generated feature detection images or one or more measurement result images generated by performing a default post-process on the one or more feature detection images on the display 104 or the like (Step S106).

The image processing device 100 receives setting (one or more setting parameters) associated with the image measuring process from a user in a state in which the one or more feature detection images or the one or more measurement result images are presented to the user (Step S108). The image processing device 100 generates one or more image measuring processes again by performing an image calculating process and/or a post-process again on the basis of the setting parameters from the user (Step S110), and displays the one or more generated measurement result images on the display 104 or the like (Step S112).

That is, the image processing device 100 performs the image measuring process based on the changed setting parameter again by presenting the user the one or more feature detection images generated using the CNN, selecting one or more feature detection images set depending on the setting from the user, and performing the set image calculating process and/or the post-process.

The processes of Steps S108 to S112 may be repeatedly performed until an instruction to determine the setting parameter is received from the user (when the determination result of Step S114 is NO).

Finally, when an instruction to determine the setting parameter is received from the user (when the determination result of Step S114 is YES), the image processing device 100 stores the currently set value as the setting parameter in the operating process (Step S116). Then, the process sequence of the preparation process ends.

Referring to FIG. 15, when a workpiece serving as a reference of the image measuring process arrives at an imaging field 6 of the camera 102, the image processing device 100 acquires an input image acquired by imaging the workpiece using the camera 102 (Step S200). At this time, the input image (image data) generated by causing the camera 102 to image the workpiece is transmitted to the image processing device 100 and is loaded to the main memory 112 of the image processing device 100.

Subsequently, the image processing device 100 performs a pre-process on the acquired input image (Step S202). The image processing device 100 performs a process of extracting a feature for each of one or more types (classes) of features from the pre-processed input image using the previously learned CNN. The image processing device 100 generates a feature detection image for each of one or more classes through the process of extracting the feature (Step S204).

When an image calculating process is designated by the setting parameter, the image processing device 100 performs the designated image calculating process on the one or more selected feature detection images and generates calculation result images (Step S206). Examples of the image calculating process include an addition operation, a subtraction operation, and weighted calculation operations thereof which are designated for the setting parameters.

Subsequently, the image processing device 100 performs the binarization process on the selected feature detection images or calculation result images on the basis of the setting parameter to generate binarized images (Step S208). The setting parameter can include a threshold value or the like which is used for the binarization process.

Subsequently, the image processing device 100 performs a determination process on the binarized images on the basis of the setting parameter and generates a measurement result image and/or a measurement result (Step S210). The setting parameter can include a labeling method and a determination threshold value which are used for the determination process.

Finally, the image processing device 100 outputs the generated measurement result image and/or the measurement result (Step S212). The output destination of the measurement result image and/or the measurement result may be the display 104 or the like or may be the PLC 10 and/or the database device 12 connected thereto via the upper network 8. The process sequence of the operating process ends.

Conditions in which the process sequence of the operating process illustrated in FIG. 15 starts may be one of a trigger signal from a timing sensor that detects arrival of a workpiece, an execution start instruction from an upper device, or an instruction of a user.

The image processing device according to the embodiment performs the image measuring process on the arbitrary inspection object using the general-purpose CNN having the plurality of classes which are previously learned. When such the general-purpose CNN is used, the same feature may be divided and appears in feature detection images of a plurality of classes or the same feature may appear commonly in feature detection images of the plurality of classes.

A measure of performing relearning of the CNN or the like may be taken for a target inspection object, but is not a practical measure in an application in which a target inspection object changes frequently. Therefore, in this embodiment, by performing image calculation on two or more feature detection images among the feature detection images generated by classes, it is possible to reduce a feature pattern based on a target inspection object appearing in the feature detection images of a plurality of classes or to bundle feature patterns, based on the same target inspection object, divided and appearing in the feature detection images of a plurality of classes.

In this way, in the image processing device according to the embodiment, arbitrary image calculation can be performed on the feature detection images, therefore, even when a general-purpose CNN is used, it is possible to provide a practical image measuring process depending on applications.

The image processing device according to the embodiment can present a user images which are generated in the course of performing the image measuring process such that the images can be compared. For example, a list of feature detection images which are generated using the CNN by classes can be presented to the user or a list of measurement result images which are generated by performing the post-process on the feature detection images can be presented to the user.

The user can adjust the setting parameter if necessary while watching the plurality of presented images. The measurement result image may be superimposed and displayed on the input image, and thus the user can understand the suitability of the setting parameter at a glance. Since the measurement result image is regenerated with adjustment of the setting parameter by the user, the user can check the suitability of the setting parameter in real time.

In the user interface screen which is provided by the image processing device according to the embodiment, the user can arbitrarily select images to be displayed, and the selection target images can include the measurement result images which are generated by performing the post-process on the calculation result images generated by an arbitrary image calculating process designated by the user, in addition to the measurement result images which are generated by performing the post-process on the feature detection images alone. By enhancing a degree of freedom in selecting images to be displayed, it is possible to facilitate adjustment of the setting parameter by the user.

According to an aspect of the invention, there is provided an image processing device that performs an image measuring process on an input image which is generated by imaging an inspection object. The image processing device includes: a feature detection image generating unit that respectively generates a plurality of feature detection images corresponding to a plurality of classes by applying a convolutional neural network having the plurality of classes learned previously to the input image; a post-processing unit that generates a measurement result by performing a post-process on at least some feature detection images of the plurality of feature detection images on the basis of a setting parameter; and a user interface unit that receives an input of the setting parameter while presenting a user at least one of at least some of the plurality of feature detection images which are generated by the feature detection image generating unit and the measurement result which is generated by causing the post-processing unit to perform the post-process using at least some of the plurality of feature detection images which are generated by the feature detection image generating unit.

According to an embodiment of the invention, the post-processing unit includes an image calculating unit that generates a calculation result image by performing an image calculating process using two or more feature detection images of the plurality of feature detection images.

According to an embodiment of the invention, the image calculating process includes at least one of addition of the feature detection images, subtraction of the feature detection images, weighted addition of the feature detection images, and weighted subtraction of the feature detection images.

According to an embodiment of the invention, the user interface unit presents the user a measurement result which is generated from the calculation result image in addition to the measurement result which is generated from the feature detection images alone.

According to an embodiment of the invention, the user interface unit determines a type of an image which is presented to the user depending on the user's selection.

According to an embodiment of the invention, the post-processing unit further includes a binarization processing unit that performs a binarization process on the feature detection images or the calculation result image. The user interface unit receives setting of a threshold value which is used for the binarization process in the binarization processing unit as the setting parameter.

According to an embodiment of the invention, when the user interface unit receives change of the setting parameter from the user, the post-processing unit generates a new measurement result by performing the post-process based on the changed setting parameter and the user interface unit presents the user the newly generated measurement result.

According to an embodiment of the invention, the user interface unit presents the user an image in which the measurement result is superimposed on the input image.

According to another aspect of the invention, there is provided a non-transitory computer readable storage medium which stores an image processing program that realizes an image processing device that performs an image measuring process on an input image which is generated by imaging an inspection object. The image processing program causes a computer to perform: a step of respectively generating a plurality of feature detection images corresponding to a plurality of classes by applying a convolutional neural network having the plurality of classes learned previously to the input image; a step of generating a measurement result by performing a post-process on at least some feature detection images of the plurality of feature detection images on the basis of a setting parameter; and a step of receiving an input of the setting parameter while presenting a user at least one of at least some of the plurality of generated feature detection images and the measurement result which is generated by performing the post-process using at least some of the plurality of generated feature detection images.

According to another aspect of the invention, there is provided an image processing system including: an imaging unit that images an inspection object; and an image processing device that performs an image measuring process on an input image which is generated by the imaging unit. The image processing device includes: a feature detection image generating unit that respectively generates a plurality of feature detection images corresponding to a plurality of classes by applying a convolutional neural network having the plurality of classes learned previously to the input image; a post-processing unit that generates a measurement result by performing a post-process on at least some feature detection images of the plurality of feature detection images on the basis of a setting parameter; and a user interface unit that receives an input of the setting parameter while presenting a user at least one of at least some of the plurality of feature detection images which are generated by the feature detection image generating unit and the measurement result which is generated by causing the post-processing unit to perform the post-process using at least some of the plurality of feature detection images which are generated by the feature detection image generating unit.

The above-disclosed embodiments should be understood to be merely exemplary, but not restrictive in all aspects. The scope of the invention is defined by the appended claims, not by the above description, and is intended to include all modifications within meanings and scopes equivalent to the scope of the claims.

What is claimed is:

1. An image processing device that performs an image measuring process on an input image which is generated by imaging an inspection object, the image processing device comprising:
    a storage, configured to store an image processing program, wherein the image processing program includes a feature detection image generating unit, a post-processing unit and a user interface unit; and
    a processor, configured to execute the program by loading a program stored in the storage into a main memory,
    wherein the processor executes the feature detection image generating unit to respectively generate a plurality of feature detection images corresponding to a plurality of classes by applying a convolutional neural network having the plurality of classes learned previously to the input image, the feature detection images respectively have different features;
    the processor executes the post-processing unit to generate a measurement result by performing a post-process on at least some feature detection images of the plurality of feature detection images on the basis of a setting parameter;
    the processor executes the user interface unit to receive an input of the setting parameter while presenting a user at least one of the measurement result and at least some of the plurality of feature detection images, wherein the plurality of feature detection images are generated by the feature detection image generating unit, and the measurement result is generated by causing the post-processing unit to perform the post-process using at least some of the plurality of feature detection images which are generated by the feature detection image generating unit,
    wherein after receiving the setting parameter by the user interface unit, the processor executes the post-processing unit to:
    select the at least some feature detection images from the plurality of feature detection images corresponding to the plurality of classes based on information indicating which feature detection image to select of the plurality of feature detection images included in the setting parameter.

2. The image processing device according to claim 1, wherein the post-processing unit includes an image calculating unit, the processor executes the image calculating unit to generate a calculation result image by performing an image calculating process using two or more feature detection images of the plurality of feature detection images.

3. The image processing device according to claim 2, wherein the image calculating process includes at least one of addition of the feature detection images, subtraction of the feature detection images, weighted addition of the feature detection images, and weighted subtraction of the feature detection images.

4. The image processing device according to claim 3, wherein the processor executes the user interface unit to present the user a measurement result which is generated from the calculation result image in addition to the measurement result which is generated from the feature detection images alone.

5. The image processing device according to claim 3, wherein the processor executes the user interface unit to determine a type of an image which is presented to the user depending on the user's selection.

6. The image processing device according to claim 3, wherein the post-processing unit further includes a binarization processing unit, the processor executes the binarization processing unit to perform a binarization process on the feature detection images or the calculation result image, and
    wherein the processor executes the user interface unit to receive setting of a threshold value which is used for the binarization process in the binarization processing unit as the setting parameter.

7. The image processing device according to claim 3, wherein, when the processor executes the user interface unit to receive change of the setting parameter from the user, the processor executes the post-processing unit to generate a new measurement result by performing the post-process based on the changed setting parameter and the processor executes the user interface unit to present the user the newly generated measurement result.

8. The image processing device according to claim 3, wherein the processor executes the user interface unit to present the user an image in which the measurement result is superimposed on the input image.

9. The image processing device according to claim 2, wherein the processor executes the user interface unit to present the user a measurement result which is generated from the calculation result image in addition to the measurement result which is generated from the feature detection images alone.

10. The image processing device according to claim 9, wherein, when the processor executes the user interface unit to receive change of the setting parameter from the user, the processor executes the post-processing unit to generate a new measurement result by performing the post-process based on the changed setting parameter and the processor executes the user interface unit to present the user the newly generated measurement result.

11. The image processing device according to claim 2, wherein the processor executes the user interface unit to determine a type of an image which is presented to the user depending on the user's selection.

12. The image processing device according to claim 11, wherein, when the processor executes the user interface unit to receive change of the setting parameter from the user, the processor executes the post-processing unit to generate a new measurement result by performing the post-process based on the changed setting parameter and the processor executes the user interface unit to present the user the newly generated measurement result.

13. The image processing device according to claim 2, wherein the post-processing unit further includes a binarization processing unit, the processor executes the binarization processing unit to perform a binarization process on the feature detection images or the calculation result image, and
wherein the processor executes the user interface unit to receive setting of a threshold value which is used for the binarization process in the binarization processing unit as the setting parameter.

14. The image processing device according to claim 13, wherein, when the processor executes the user interface unit to receive change of the setting parameter from the user, the processor executes the post-processing unit to generate a new measurement result by performing the post-process based on the changed setting parameter and the processor executes the user interface unit to present the user the newly generated measurement result.

15. The image processing device according to claim 2, wherein, when the processor executes the user interface unit to receive change of the setting parameter from the user, the processor executes the post-processing unit to generate a new measurement result by performing the post-process based on the changed setting parameter and the processor executes the user interface unit to present the user the newly generated measurement result.

16. The image processing device according to claim 2, wherein the processor executes the user interface unit to present the user an image in which the measurement result is superimposed on the input image.

17. The image processing device according to claim 1, wherein, when the processor executes the user interface unit to receive change of the setting parameter from the user, the processor executes the post-processing unit to generate a new measurement result by performing the post-process based on the changed setting parameter and the processor executes the user interface unit to present the user the newly generated measurement result.

18. The image processing device according to claim 1, wherein the processor executes the user interface unit to present the user an image in which the measurement result is superimposed on the input image.

19. A non-transitory computer readable storage medium, which stores an image processing program that realizes an image processing device that performs an image measuring process on an input image which is generated by imaging an inspection object, the image processing program causing a computer to perform:
a step of respectively generating a plurality of feature detection images corresponding to a plurality of classes by applying a convolutional neural network having the plurality of classes learned previously to the input image, the feature detection images respectively have different features;
a step of generating a measurement result by performing a post-process on at least some feature detection images of the plurality of feature detection images on the basis of a setting parameter; and
a step of receiving an input of the setting parameter while presenting a user at least one of the measurement result and at least some of the plurality of generated feature detection images, wherein the measurement result is generated by performing the post-process using at least some of the plurality of generated feature detection images,
wherein performing the post-process includes
after receiving the setting parameter selecting the at least some feature detection images from the plurality of feature detection images corresponding to the plurality of classes based on information indicating which feature detection image to select of the plurality of feature detection images included in the setting parameter.

20. An image processing system comprising:
a hardware image capturer, configured to image an inspection object; and
an image processing device that performs an image measuring process on an input image which is generated by the hardware image capturer,
wherein the image processing device includes:
a storage, configured to store an image processing program, wherein the image processing program includes a feature detection image generating unit, a post-processing unit and a user interface unit; and
a processor, configured to execute the program by loading a program stored in the storage into a main memory,
wherein the processor executes the feature detection image generating unit to respectively generate a plurality of feature detection images corresponding to a plurality of classes by applying a convolutional neural network having the plurality of classes learned previously to the input image, the feature detection images respectively have different features;
the processor executes the post-processing unit to generate a measurement result by performing a post-process on at least some feature detection images of the plurality of feature detection images on the basis of a setting parameter;
the processor executes the user interface unit to receive an input of the setting parameter while presenting a user at least one of the measurement result and at least some of the plurality of feature detection images, wherein the plurality of feature detection images are generated by the feature detection image generating unit and the measurement result is generated by causing the post-processing unit to perform the post-process using at least some of the plurality of feature detection images which are generated by the feature detection image generating unit,
wherein after receiving the setting parameter by the user interface unit, the processor executes the post-processing unit to:
select the at least some feature detection images from the plurality of feature detection images corresponding to the plurality of classes based on information indicating which feature detection image to select of the plurality of feature detection images included in the setting parameter.

* * * * *